United States Patent [19]

Yoder

[11] Patent Number: 4,920,272

[45] Date of Patent: Apr. 24, 1990

[54] DETECTOR FOR RADON

[75] Inventor: Robert C. Yoder, Crete, Ill.

[73] Assignee: Tech/Ops Landauer, Inc., Glenwood, Ill.

[21] Appl. No.: 211,516

[22] Filed: Jun. 24, 1988

[51] Int. Cl.[5] ............................ G01T 1/08; G01T 5/10
[52] U.S. Cl. ............................... 250/475.2; 250/253; 250/472.1; 250/473.1
[58] Field of Search ............... 250/475.2, 474.1, 473.1, 250/472.1, 255, 253

[56] References Cited

U.S. PATENT DOCUMENTS

| | | | |
|---|---|---|---|
| 3,505,523 | 4/1970 | Becker | 250/473.1 |
| 4,468,558 | 8/1984 | Malmqvist et al. | 250/253 |
| 4,704,537 | 10/1987 | Urban et al. | 250/472.1 |
| 4,778,992 | 10/1988 | Wheeler | 250/255 |

FOREIGN PATENT DOCUMENTS 134392  2/1979  German Democratic Rep. ................................. 250/472.1

OTHER PUBLICATIONS

M. Urban and E. Piesch, *Radiation Protection Dosimetry*, vol. 1, No. 2, (1981), pp. 97–109; "Low Level Environmental Radon Dosimetry With a Passive Track Etch Detector Device".

*Primary Examiner*—Constantine Hannaher
*Attorney, Agent, or Firm*—Richard Bushnell

[57] ABSTRACT

A detector member having the property of forming damage tracks along the paths traversed by impinging alpha particles is provided with at least two opposing detection surfaces exposed on respective opposite sides of the detector member. The opposing detection surfaces enable the detector member to form damage tracks by alpha particles impinging either of the detection surfaces which are simultaneously exposed to irradiation. Conventional cellulosic film such as cellulose nitrate can be employed with both sides of the film serving as detection surfaces. The dual-surfaced film can be framed and packaged in a compact configuration convenient to use in homes or offices. The damage tracks from both of the irradiated surfaces can be simultaneously counted using preferred spark counting techniques.

10 Claims, 1 Drawing Sheet

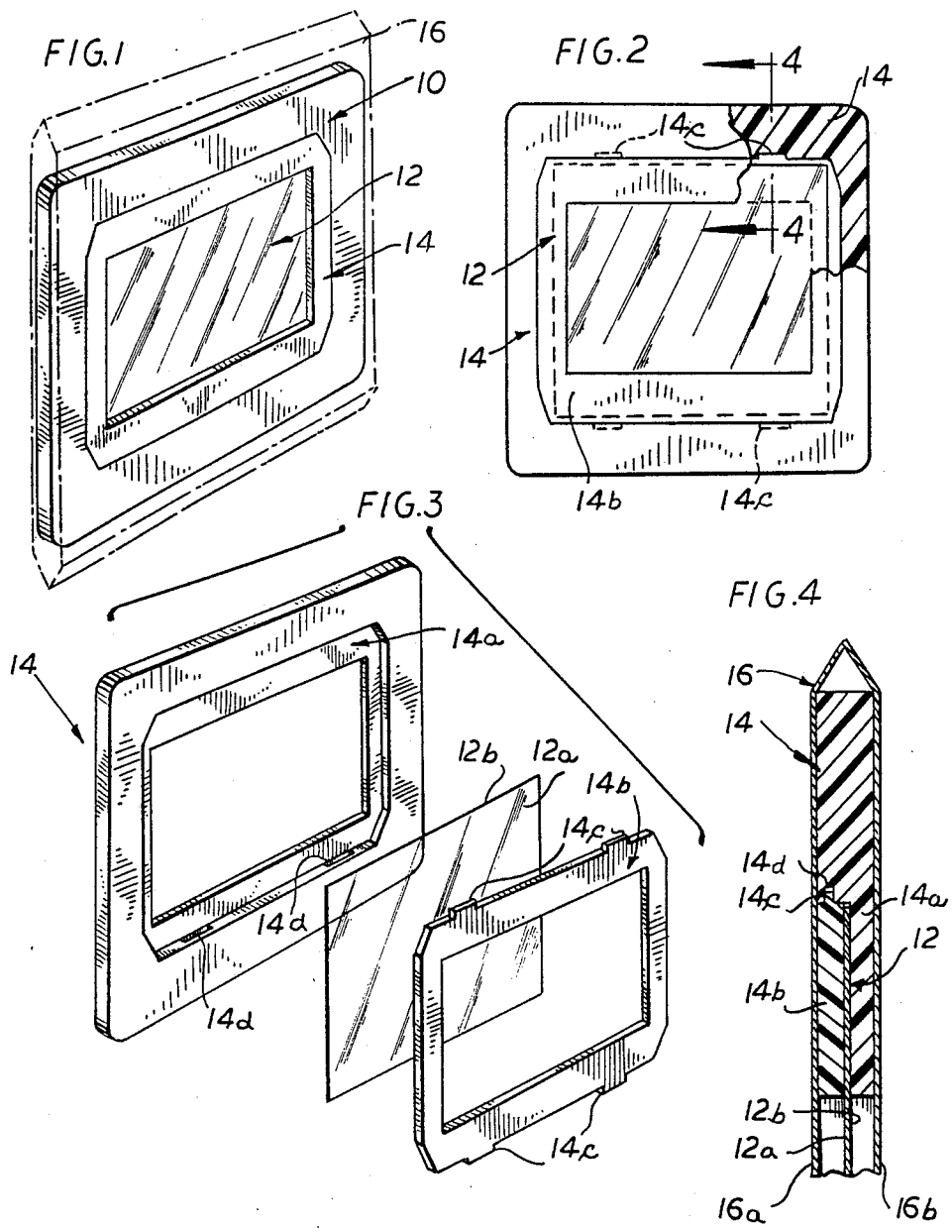

DETECTOR FOR RADON

BACKGROUND OF THE INVENTION

This invention relates to devices for detection of radon gas employing a detector material which records the impact of alpha particles emitted by the radon gas and its radioactive derivatives. More particularly this invention relates to radon detection devices which are dimensioned for convenient personal use as well as in permanent installations.

As described, for example, in U.S. Pat. No. 3,665,194 (Alter et al., 1972) devices for detection of radon gas have been developed in which the radon gas is detected by exposure of a film of detector material which is coated on one face of a conventional glass microscope slide or in the form of a separate sheet of material which is cemented or secured to a baseplate. The detector materials is exposed to alpha particles emitted by the radon gas and the detector material has the property of forming damage tracks along paths traversed by the alpha particles. After exposure, the material is etched with a reagent to enlarge the tracks, making them visible so they can be counted. The number of tracks formed during the exposure is a measure of the amount of radon in the monitored area. As more fully described in the aforementioned patent, cellulosic plastics, particularly cellulose nitrate have been employed as the detector materials because radioactive decay products or daughters or radon gas which have plated-out or deposited on the surface of these materials will emit alpha particles which are too energetic to form detectable damage tracks on these materials. Consequently, these materials will only register and form damage tracks by alpha particles originating at least a few centimeters away from the surface of the material and degraded in energy by passing through the few centimeters of air so that their energy is less than or equal to the track formation threshold. Cellulose nitrate, for example, has a track formation threshold of approximate 3.5 MeV. As a result these materials can register alpha particles emitted by radon gas migrating within the vicinity of their surface but at the same time exclude registration of alpha particles emitted by radon decay products which accumulate by direct deposition on the surface. The single registration surface of the detector member or film is exposed to the radon gas and to impingement of the emitted alpha particles, with the subsequent etching treatment to develop the detectable tracks.

SUMMARY OF THE INVENTION

In accordance with the present invention, a detector member having the property of forming damage tracks along the paths traversed by impinging alpha particles is provided with at least two opposing detecting surfaces exposed on respective opposite sides of the detector member. The opposing detection surfaces enable the detector member to form damage tracks by alpha particles impinging either of the detection surfaces which are simultaneously exposed to irradiation. Conventional cellulosic film such as cellulose nitrate can be employed with both sides of the film serving as detection surfaces. In order to enable adequate irradiation in suitably short exposure time, the dual surfaces of the detector film not only reduce the amount of film required in radon monitoring, but also enable the detection device to be packaged in a compact configuration convenient to use in homes or offices.

In a preferred embodiment cellulose nitrate film is mounted in an apertured frame which allows monitoring exposure of both surfaces of the film. The frame can provide shielded portions of the film which enable contrast with the irradiation of the exposed portions of the film surfaces. Both of the irradiated detection surfaces of the film can be etched to develop the damage tracks while supported in the frame. Subsequently, the damage tracks from both of the irradiated surfaces can be simultaneously counted using preferred spark counting techniques.

BRIEF DESCRIPTION OF THE DRAWING

FIG. 1 is a perspective view of one embodiment of the radon detection device in accordance with the invention;

FIG. 2 is a plan view of the detection device shown in FIG. 1 with a portion of the supporting frame of the device broken away;

FIG. 3 is an exploded perspective view of the detection film and supporting frame of the device shown in FIGS. 1 and 2; and FIG. 4 is a sectional view taken along Line 4—4 in FIG. 2, viewed in the indicated direction, and showing the closely engaged walls of a protective package for the detection device.

DESCRIPTION OF THE ILLUSTRATED EMBODIMENT

Referring to FIG. 1, an embodiment of the framed detector foil according to the invention is generally designated by reference character 10. As best illustrated in FIG. 3, the framed detector 10 includes a film or foil 12 of track detector material which is mounted within the apertured plastic frame 14 so that both of the opposing foil surfaces 12a and 12b can be exposed to radon monitoring irradiation. The frame 14 has a recessed and apertured, rectilinear ledge or interior flange 14a on which the foil 12 is laid and then secured by an overlaid frame insert 14b which fits within the recess to clamp the foil 12 against the flange 14a. As shown in FIGS. 2, 3 and 4, the insert and flange have cooperating tongue and mortise pairs 14c and 14d which are snap fit to lock the insert in the frame.

In order to insulate the detector foil from alpha particle radiation during shipping and handling prior to and after radon monitoring exposure, the framed detector 10 is placed in a generally tightly fitting envelope 16 of material, for example, aluminum or suitably thick plastic such as Mylar or similar polyester which will not absorb radon and is impenetrable to alpha particles. The envelope 16 need not be sealed as long as its walls 16a and 16b are sufficiently taut to generally engage the frame 14 and prevent enclosing a significant volume of air potentially containing alpha particle emission agents within the envelope. Any alpha particles emitted within the closely fitting and taut envelope will then be too energetic to register tracks in the detector foil.

The track detector foil 12 is preferably a suitable cellulosic composition, for example, cellulose nitrate which will not register detectable tracks from alpha particles emitted by radon decay daughters directly deposited on either exposed surface of the foil 12. Suitable cellulose nitrate is commercially available from Eastman Kodak-Pathe of France in a particularly preferred grade designated LR115 which has a cellulose nitrate film thickness of approximately 13 microns; the LR115 cellulose nitrate film is mounted on a thicker plastic support backing which would normally shield one surface of the foil as employed in conventional alpha particle detection. After removing the plastic backing from the LR115 material, the cellulose nitrate film can be employed as the dual-surfaced foil 12 which is mounted in the frame 14 for simultaneous exposure of the opposing surfaces 12a, 12b. The shielded portions of the foil surfaces 12a, 12b which are clamped between the flange 14a and insert 14b provide contrast to the exposed surface portions of the foil.

The detector can be fabricated from other conventional materials which register alpha particle impact, for example, cross-linked poly (allylglycol carbonate) such as the polymeric material designated CR-39 commercially available from PPG Industries.

Prior to the exposure of the framed foil 10 for radon detection, the frame 14 provides shipping and handling support for the foil 12. Following the radon detection exposure of both foil surfaces 12a and 12b, the frame 14 provides support for the foil 12 during the etching treatment to develop the damage tracks registered during the exposure to alpha particle irradiation.

In order to develop the tracks in the LR115 foil which are suitable for spark counting techniques, the tracks are etched, for example with 4 to 6N NaOH at 47°–50° C. for approximately 3 hours, with variations governed by the conditions of the spark counting parameters.

Following the etching treatment, the developed tracks can be counted using conventional methods. In a particularly preferred method, spark counting techniques allow simultaneous counting of the tracks on both of the exposed foil surfaces, and provide rapid evaluation of large numbers of foils. Spark counting techniques employ counting of voltage or current pulses generated by discharges through the etched tracks in the detector foil placed between electrodes, as more fully described by S. A. Durrani and R. K. Bull in *Solid State Nuclear Track Detection* published by Pergamon Press, Oxford (1987) pp. 169–173.

The dual registration surfaces, provided on the track detector of the invention increase the irradiation exposure surface and reduce the quantity of detection material needed for a monitored area in comparison to the conventional employment of only one side of the detector film. The supporting frame for the detector foil enables convenient handling and processing with automated equipment as well as convenient labeling and identifying of the foil.

In light of the foregoing description of the embodied detector of the invention, it will be evident to those skilled in such detection that various aspects may be modified without departing from the invention. As such, the scope of the invention is not limited by the particular embodiment illustrated and described herein and is defined by the appended claims and equivalents thereof.

The invention is claimed as follows:

1. A detector for radon gas comprising: a detector member including at least two opposing detection surfaces having respective portions symmetrically exposed on respective opposite sides of the detector member and having the property of forming damage tracks along paths traversed by alpha particles impinging either of said surfaces; and support structure means for supporting and orienting said detector member with both said detection surfaces in symmetrical, simultaneous exposure to said alpha particles during use of said detector.

2. The detector according to claim 1 wherein said detector member comprises a strip of film material including opposite sides thereof defining said detecting surfaces.

3. The detector according to claim 1 further comprising mask means shielding a portion of one of said detector surfaces from alpha particle infringement in order to produce exposure contrast between said shielded portion and damage tracks traversed on the exposed portion of said detector surface.

4. The detector according to claim 1 wherein each said detector surface is insensitive to alpha particles originating on or immediately adjacent said surface.

5. The detector according to claim 1 wherein the composition of said detector surfaces comprises cellulose nitrate.

6. The detector according to claim 1 in combination with a protective package containing said detector member, wherein said package comprises respective walls in sufficiently close proximity to said detection surfaces to substantially prevent registration of alpha particle damage tracks upon said detector member during containment of said detector member within said package.

7. The detector according to claim 1 wherein said detector member has a thickness between said opposing detection surfaces of approximately 13 microns.

8. A method for detection of alpha particles, particularly emitted from radon gas and its radioactive derivatives, comprising: exposing to said alpha particles a detector member having at least two opposing detection surfaces exposed to said alpha particles on respective opposite sides of said detector member, and having the property of forming damage tracks along paths traversed by said alpha particles impinging either of said surfaces; and simultaneously counting said damage tracks on both said exposed detection surfaces.

9. A method according to claim 8 wherein said counting step comprises counting electrical discharges through said damage tracks.

10. The method according to claim 8, wherein said exposing step exposes symmetrical portions of said respective detection surfaces.

* * * * *